US007062467B2

(12) United States Patent
Sako et al.

(10) Patent No.: US 7,062,467 B2
(45) Date of Patent: *Jun. 13, 2006

(54) INFORMATION DISTRIBUTING METHOD AND SYSTEM

(75) Inventors: Yoichiro Sako, Tokyo (JP); Masayuki Obata, Tokyo (JP); Shuichi Ito, Tokyo (JP); Tatsuya Inokuchi, Kanagawa (JP); Kazuko Sakurai, Chiba (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 209 days.

(21) Appl. No.: 09/406,486

(22) Filed: Sep. 27, 1999

(65) Prior Publication Data

US 2003/0069851 A1 Apr. 10, 2003

(30) Foreign Application Priority Data

Sep. 29, 1998 (JP) .................................. 10-275725

(51) Int. Cl.
*G06F 17/00* (2006.01)
(52) U.S. Cl. .............................. 705/52; 705/14; 705/34; 709/224; 709/226
(58) Field of Classification Search ................. 705/52, 705/14; 707/10, 2, 20; 345/700; 370/486; 709/226

See application file for complete search history.

(56) References Cited

U.S. PATENT DOCUMENTS

| 5,887,192 | A | * | 3/1999 | Nishio .......................... 710/20 |
| 5,987,424 | A | * | 11/1999 | Nakamura .................... 705/14 |
| 6,002,694 | A | * | 12/1999 | Yoshizawa et al. .......... 370/486 |
| 6,011,537 | A | * | 1/2000 | Slotznick ..................... 345/700 |
| 6,016,509 | A | * | 1/2000 | Dedrick ....................... 709/224 |
| 6,119,109 | A | * | 9/2000 | Muratani et al. ............ 705/400 |
| 6,148,301 | A | * | 11/2000 | Rosenthal ..................... 707/10 |
| 6,226,366 | B1 | * | 5/2001 | Bala et al. ................... 379/111 |
| 6,249,532 | B1 | * | 6/2001 | Yoshikawa et al. .......... 370/486 |
| 6,269,361 | B1 | * | 7/2001 | Davis et al. .................... 707/2 |
| 6,282,276 | B1 | * | 8/2001 | Felger .................... 379/114.19 |
| 6,289,314 | B1 | * | 9/2001 | Matsuzaki et al. ............. 455/1 |
| 6,324,620 | B1 | * | 11/2001 | Christenson et al. ........ 711/112 |

FOREIGN PATENT DOCUMENTS

WO    WO 0233574 A2 *  4/2002

* cited by examiner

*Primary Examiner*—Firmin Backer
(74) *Attorney, Agent, or Firm*—Frommer Lawrence & Haug LLP; William S. Frommer; Thomas F. Presson (57) ABSTRACT

When the amount of money billed each time the information is distributed once is determined depending on the number of times that the information is distributed within a predetermined time period, the intention of information offerer and the estimation of user reflects automatically on the amount of money billed when the information is distributed.

25 Claims, 8 Drawing Sheets

INFORMATION DISTRIBUTING METHOD AND SYSTEM

BACKGROUND OF THE INVENTION

1. Field of the Invention

The present invention relates to an information distributing method and system for distributing information subjected to billing.

2. Description of the Related Art

In recent years, various kinds of information (hereinafter referred to as contents) circulate with the development of the so-called multimedia industry. These contents are distributed by an information distributing service (hereinafter referred to as service) using wireless communication such as satellite communication as well as wired communication such as CATV (Cable Television), internet and so on. In this service, a predetermined billing for the distributed contents is carried out. The conventional service transmits music information and picture information as a part of respective audio information and video information to a user on a receiving side (hereinafter referred to merely as user) in a prescribed format.

However, there are many cases were an amount of money billed for these contents is determined by the initial setting independently of user's need. User generally cannot know whether or not the distributed contents are worthy of a bill until he is serviced. On the other hand, information distributors that distribute the contents tend to distribute to users the contents which seem to be in great demand without considering the quality of its substance and the like.

Therefore, such contents that have the good substance but are in small demand and the contents of those who have no ability to distribute such information have no opportunity of being distributed to user. However, if such contents could be in conditions to be distributed, user might be at a loss if that contents are worthy of paying for the bill.

From these actual situations, prices and the like of the contents themselves in the past, for example, in the distribution of music, etc. have seldom been affected by an intention of information offerer (e.g. copyright holder) and an estimation of user.

SUMMARY OF THE INVENTION

Therefore, an object of the present invention is to provide an information distributing method and system by which the above problem is solved and in which when information subjected to billing is distributed, an amount of money billed when information is distributed once reflects automatically the intention of information offerer and the estimation of user.

The above object is accomplished, according to the present invention, by an information distributing method and system for distributing information subjected to billing, characterized in that an amount of money billed every time the information is distributed once is determined depending on the number of times that the information is distributed within a predetermined time period.

According to the above structure, when information subject to billing is distributed, an amount of money billed every time the information is distributed once is determined depending on the number of times that the information is distributed by distributing means within a predetermined time period. In short, depending on the number of times that the information is distributed, an amount of money to bill is determined.

DESCRIPTION OF THE PREFERRED EMBODIMENTS

Preferred modes for carrying out the resent invention will be described below in detail with reference to the accompanying drawings.

In addition, because the following modes are preferred practical embodiments according to the present invention, various technically preferable limitations are added thereto. However, a scope of the present invention is not restricted to these modes unless there is a particular description to limit the present invention in the following description.

Figure 1:
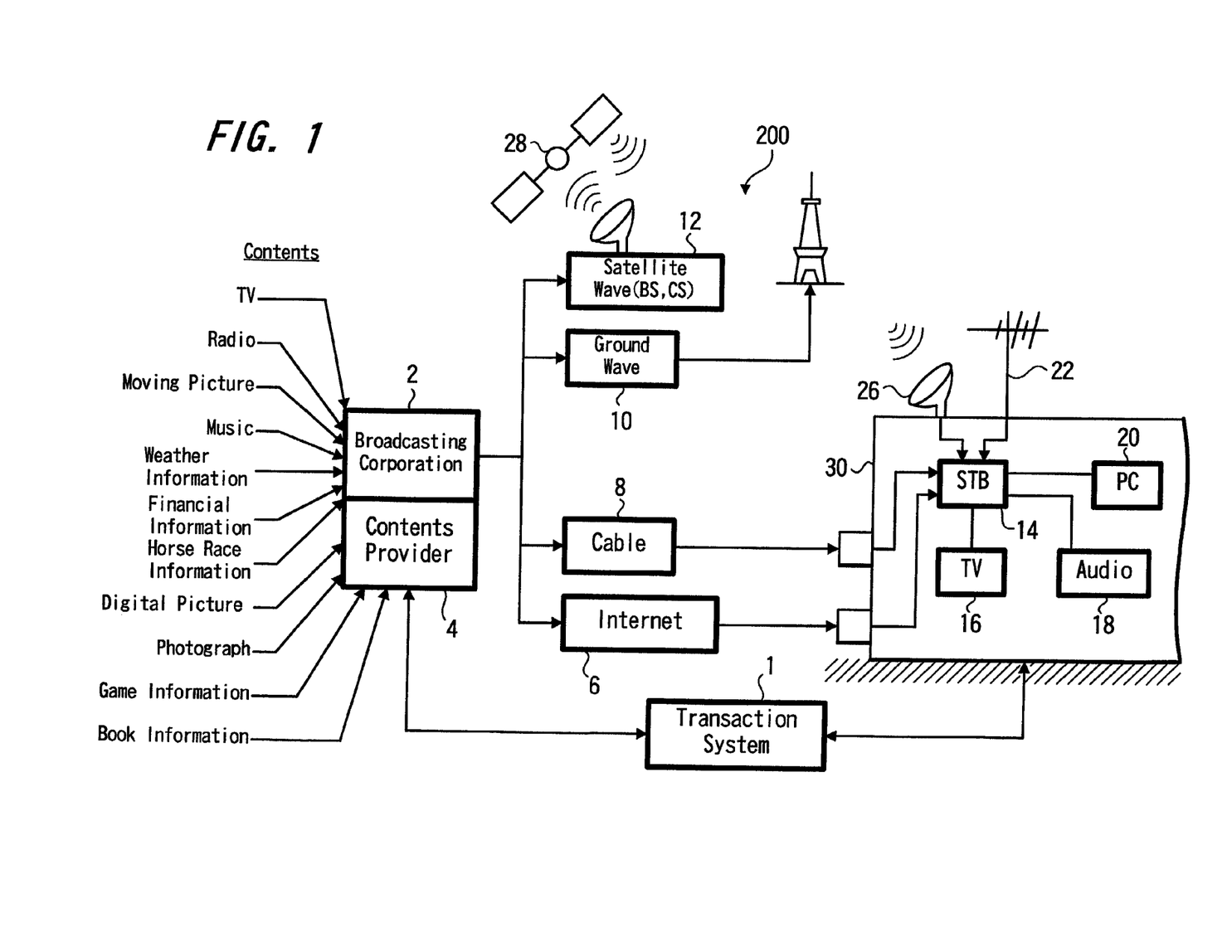
FIG. 1 is an imaginary diagram showing an information distributing system to which the information distributing method as the first embodiment according to the present invention is applied.

Terms used in this description have, for example, the following meanings. "Contents" mean the substance of information to be distributed (It indicates audio information, video information, game information or book information, or any combination of them, e.g. music information, picture information, game software or electronic book information, or any combination of them, respectively.). "Contents data (information)" mean data of contents to be distributed. "Information distributor (contents distributor)" means a corporation, etc. that distributes the contents to user. "Information offerer(contents offerer)" means those who offer the contents to the information distributor. "User 30 (home)" in FIG. 1 is shown as representative of a third party to whom the contents are distributed from the information distributor. "Access" means that user refers to (view, listen to, etc.) or downloads the contents from the information distributor. "Amount of transaction" means an amount indicating a frequency of user's access to the information distributor.

A First Embodiment

FIG. 1 is an imaginary diagram showing an information distributing system to which the information distributing method as the first embodiment according to the present invention is applied.

The information distributing system 200 (information distributing apparatus) is such a system that the contents which are held by the contents providing corporation such as a broadcasting corporation 2 and a contents provider 4 are distributed to the home 30, e.g. through internet 6, cable 8, ground wave 10 or satellite wave 12 (BS (broadcasting Satellite), CS (Communication Satellite)). Here, these contents are information such as television program information (TV), radio broadcast contents (radio), moving picture, music, game, book, weather information, financial information, horse race information, digital picture, and photograph, or any combination of them. The contents are offered to the information distributor, e.g. from the information offerer.

In the user 30, connection terminals for connecting to the cable 8 and the internet 6, a personal computer 20 (PC), an audio 18 as a music reproducing apparatus, an antenna 22 and a parabola antenna 26 are connected to a set-top box 14 (STB). The set-top box 14 connects these equipments, etc., stores the contents data transmitted, e.g. through a signal line for a mass of fast data cable 8), the parabola antenna 26 or antenna 22, etc. and delivers that information to each equipment, etc. within the user 30.

The above described information distributing system 200 has a transaction system 1 for billing to each user 30 whenever the broadcasting corporation 2 or the contents provider 4 distributes the predetermined contents to the user 30. The transaction system 1 is implemented, e.g. by a computer shown below.

Figure 2:
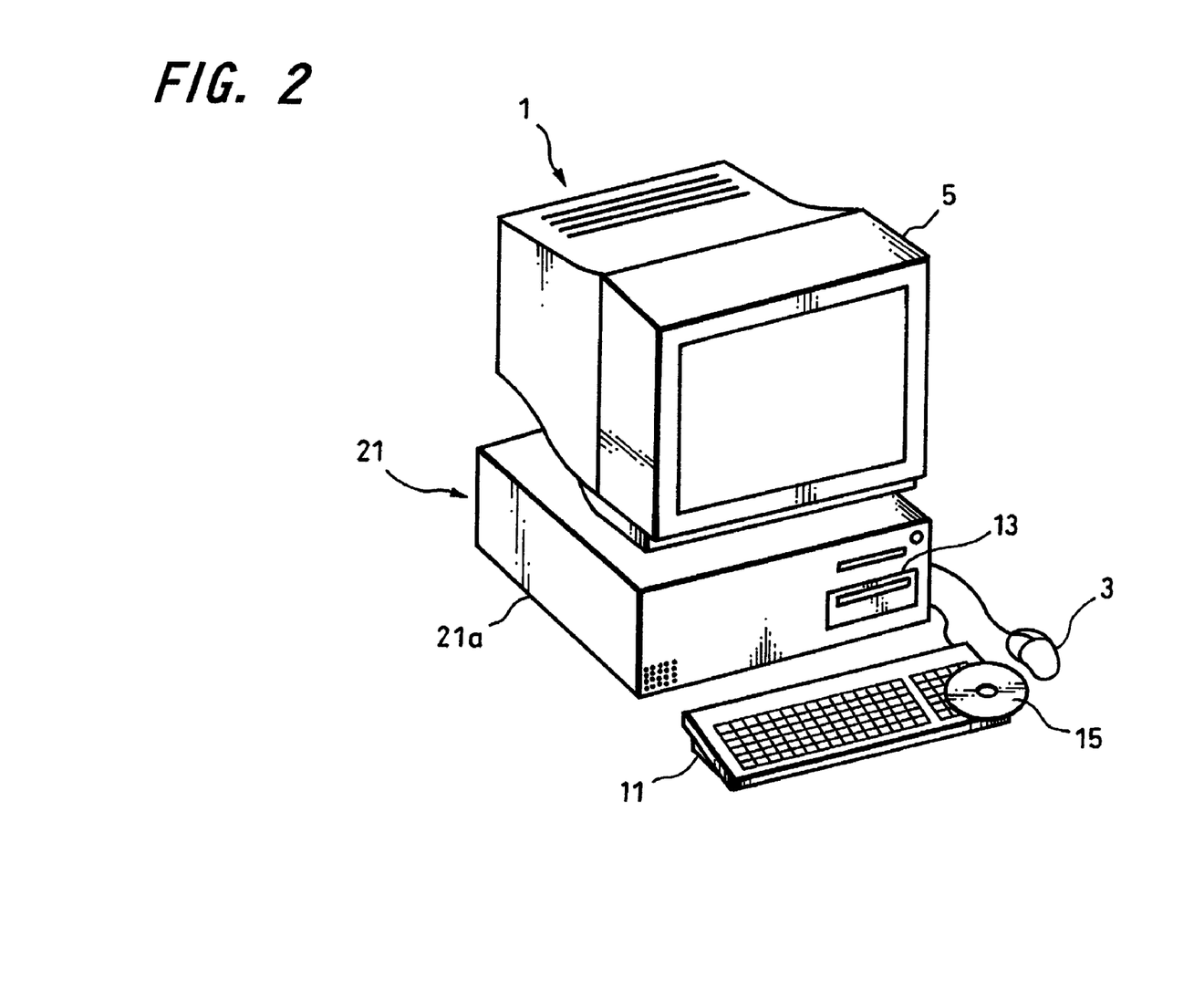
FIG. 2 is a perspective view showing an example of the outward appearance of the transaction system in FIG. 1.

FIG. 2 is a perspective view showing an example of an outward appearance of the transaction system in FIG. 1. The transaction system 1 is, e.g. a computer capable of fast processing (It may be a so-called personal computer). The transaction system 1 is, e.g. a computer 21 as described above. The computer 21 comprises means to grasp distributing conditions of the information distributor and receiving conditions of the user 30. The computer 21 has a body 21a including a controller such as a central operational processing unit (CPU), a disk unit 13 installed in the body 21a, a pointing device 3, a display 5 and a keyboard 11.

The computer 21 comprises the disk unit 13 which can at least read out, e.g. information of an information recording medium 15. This information recording medium 15 is, e.g. a compact disk CD-ROM), a flexible disk (floppy disk) and so on.

Figure 3:
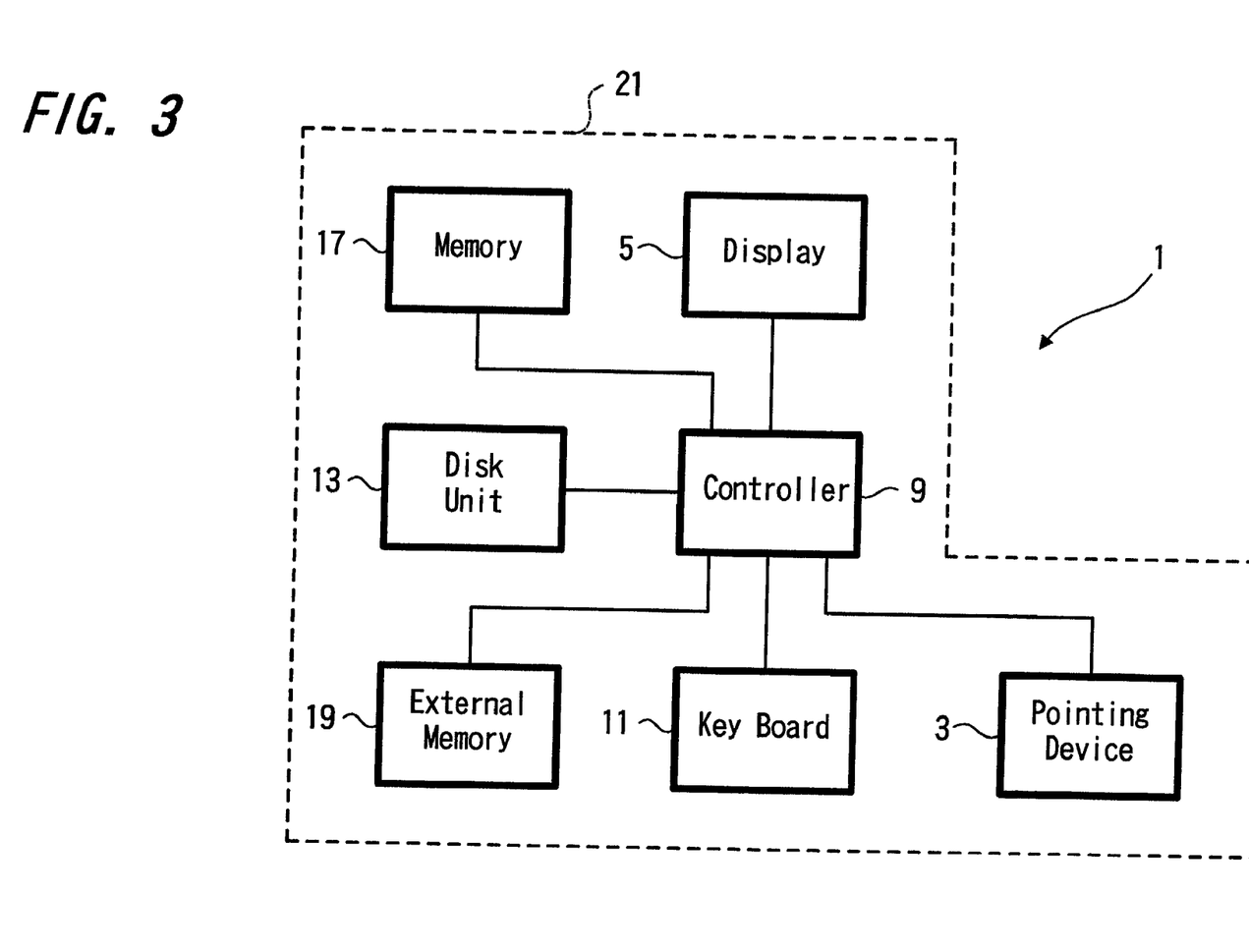
FIG. 3 is block diagram showing an example of the detailed electrical structure of the computer in FIG. 2.

FIG. 3 is a black diagram showing an example of a detailed electrical structure of the computer in FIG. 2.

The computer 21 has the controller 9, the display 15, a memory 17, the disk unit 13 and an external memory 19, and preferably the pointing device 3 and the keyboard 11.

The controller 9 is connected, e.g. to the display 5, the memory 17, the disk unit 13, the external memory 19 and preferably to the pointing device 3 and the keyboard 11. The controller 9 controls each of the above connected blocks. The controller 9 stores software in the external memory 19 such as a hard disk and executes it at need by making the memory 17 such as RAM (Random Access Memory) a work area.

The display 5 is a display unit such as a CRT (Cathode Ray Tube) or a liquid crystal display. The pointing device 3 is an operating means for the computer 21 such as a mouse.

The keyboard 11 is an operating portion of the computer 21 provided for operating the computer 21 instead of the pointing device 3, e.g. for a learner who is inexperienced in the pointing device 3. Additionally, because the transaction system 1 distributes the contents automatically, the keyboard 11 and pointing device 3 are dispensable in normal operation.

The transaction system 1 has the above described structure and next the method for distributing information for which the billing is performed will be described with reference to FIG. 1 to FIG. 3.

Figure 4:
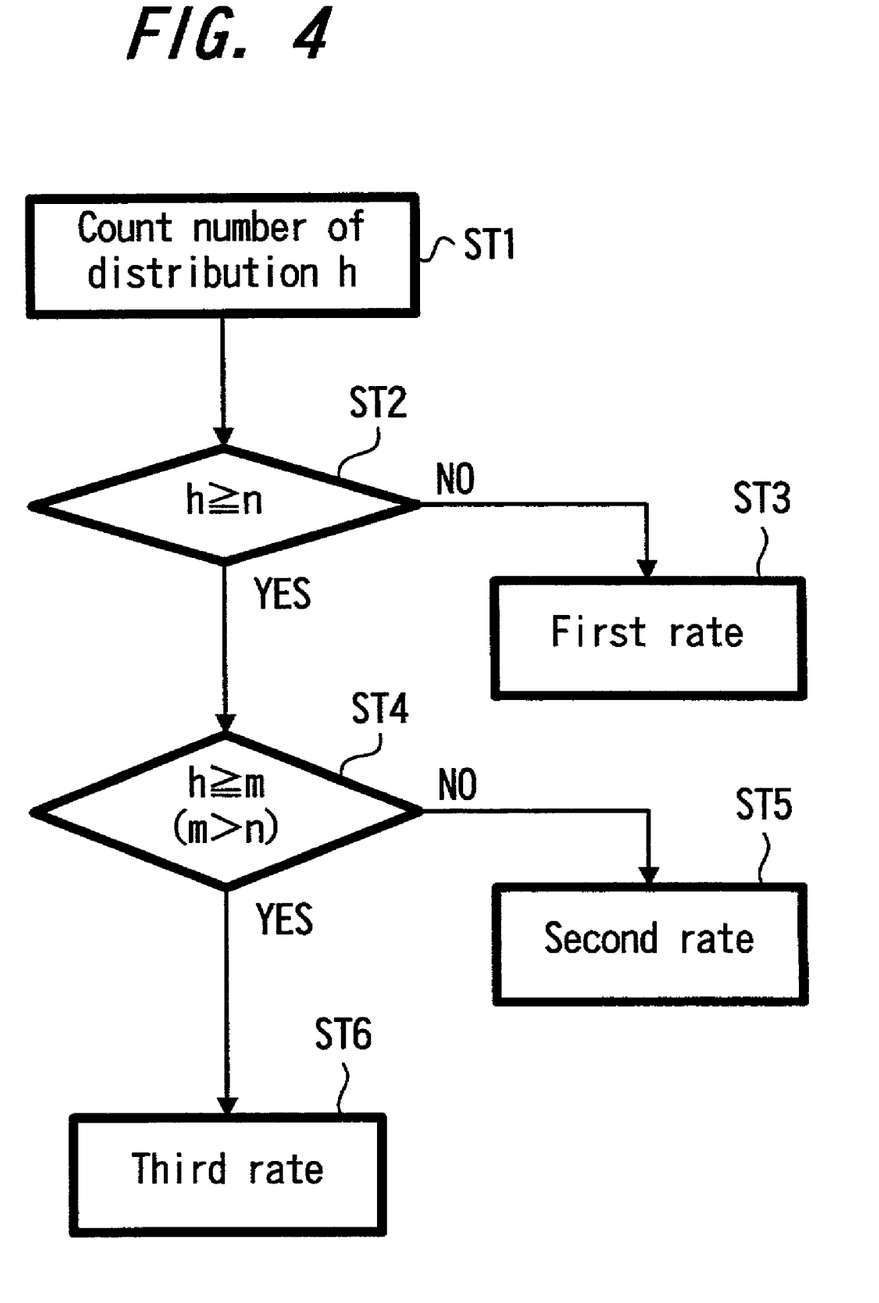
FIG. 4 is a flow chart showing an example of the billing process in the information distributing method as the first embodiment according to the present invention.

FIG. 4 is a flow chart showing an example of a billing process in the information distributing method as the first embodiment according to the present invention. In the following description, a first reference number of distribution n is defined, e.g. as one thousand times and a second reference number of distribution m is defined as ten thousand times. It is noted here that the transaction system 1 is such a system that, each time the number of distribution h reaches the fist reference number of distribution n and the second reference number of distribution m respectively, it alters the amount of money to bill (In this description, referred to merely as billed amount) every time the distribution is made once. The aforesaid first reference number of distribution n and second reference number of distribution m as well as a first rate, a second rate and a third rate described below can be set optionally on the side of transaction system 1. Thus, they are described below by way of example.

The transaction system 1 always counts the number of distribution h in which the contents are distributed by distributing means to the user 30 from the broadcasting corporation 2 or the contents provider 4 as shown in FIG. 1 (step ST1). The distributing means includes, for example, wireless communication such as satellite communication and ground wave communication, wired communication such as cable communication and internet, and postal service or the like. When the distributing means is the postal service, for example, a predetermined operator inputs to the transaction system 1 that the contents to be distributed has been mailed. When the distributing means is other than the postal service, for example, predetermined software monitors that to count.

The transaction system 1 counts the number of times that the information has been distributed within a predetermined time period. As specific examples of the above predetermined time period, the following time period can be set respectively.

Preferably, the transaction system 1 counts the number of distribution h (amount of transaction) as the number of times that the information has been distributed within a time period from a predetermined time point such as a time point when some contents begin to be distributed to the current time point. This makes it possible for the user 30 to estimate the billed amount based on the total number of distribution (e.g. in case of CD (Compact Disk), etc. such as the total number of sold CD), e.g. within the above time period to acquire that contents. The above described "predetermined time point" may otherwise be set variously at the beginning of the year, the beginning of the fiscal year, the beginning of the month, the beginning of the week and so on.

Moreover, the transaction system 1 may preferably count the number of distribution h within a definite term (e.g. an hour, a day, a week, a month or a year, etc.), e.g. from the redetermined time point. This makes it possible for the user 30 to acquire the contents after estimating whether to acquire or not with reference to the billed amount, e.g. based on the total number of distribution per unit time period (such as a hit chart of the week or the month) within the aforesaid term.

Furthermore, the transaction system 1 may preferably count the number of distribution h, e.g. from an optionally set time point to the current time point, the number of distribution h from a first optionally set time point to a second optionally set time point, or the number of distribution h for a definite term from an optionally set time point.

The time point to begin counting is, e.g. always set fluidly. This makes it possible for the distributor side to change appropriately the time point of beginning to a desired time, even if, for example, the predetermined time point proves to be unsuitable. Also, it is possible to set a special term (e.g. a bonus sale, a Christmas sale or a campaign, etc.) for controlling the billed amount. The user 30 can estimate the billed amount based on the total number of distribution per unit time period within this special term to acquire the contents.

Moreover, the transaction system 1 may preferably count the number of distribution h within a definite term, e.g. down to the current time point or the number of distribution h until the optionally set time point (e.g. twenty-four o'clock of the day before the current time point or Sunday immediately before the current time point, etc.). This makes it possible for the user 30 to estimate the billed amount based on the total number of distribution h, e.g. for an immediately prior week, month or year to acquire the contents.

Furthermore, the transaction system 1 can, e.g. preferably prepare a plurality of the predetermined terms to control the billed amount in a composite manner depending on the respective numbers of distribution h. Again, the transaction system 1 may be arranged so that the user can optionally select one of the above plurality of predetermined terms. This enables the transaction system 1 to carry out the billing for the contents based on various standards in addition to the above described advantages. Also, the user 30 can select his own favorite system of billing.

The transaction system 1 decides whether or not the number of distribution h reaches the first reference number of distribution n (step ST2). If no, the billed amount turns to the first rate (step ST3). If yes, the next step ST4 will follow.

If it is reached, the transaction system 1 decides whether or not the number of distribution h reaches the second reference number of distribution m (step ST4). If no, the billed amount turns to the second rate (step ST5). If yes, it turns to the third rate (step ST6).

Suppose here the first rate is zero yen, the second rate being one hundred yen, and the third rate being two hundred yen, if the number of distribution h is less than one thousand times, the transaction system 1 bills zero yen; if the number of distribution h is one thousand or more times and less than ten thousand times, it bills one hundred yen; if it is ten thousand or more times, it bills two hundred yen. Therefore, the transaction system 1 can make free of the billed amount while the number of distribution h is small to open the contents more widely to the public. As the number of distribution h increases gradually, it an make larger of the billed amount.

The user 30 acquires the billing information containing the billed amount thus determined and decides, e.g. whether to download or not the contents data. The user 30, for example, when downloading, acquires from the information offerer a key for decoding a cipher applied to the contents. The contents data is subjected to billing in reflection of the will, etc. of user 30 and distributed automatically to the user 30.

With the above described transaction system 1, when, for example, the information offerer who is not widely known in society (hereinafter shortened to "nameless") intends to make the contents widespread among the users 30 as a third party, if he makes the contents open free through the information distributor, he can provide an environment in which many of the users 30 can acquire the contents easily.

In other words, while the number of distribution h is small, the user 30 cannot understand the degree of quality of the substance (contents) and is at a loss whether to pay for the bill, but he can easily access because of being free. On the other hand, the information offerer can also provide his own contents broadly to a third party.

Also, the user can understand that the contents of which the number of distribution h becomes large seem to be worthy of paying for the bill, so that he can easily decide whether to access the contents. On the other hand, when the number of distribution h exceeds the first reference number of distribution n, the original object of opening the contents to the public is accomplished and so the information offerer can gain a reward corresponding with the contents.

This enables the transaction system 1 to provide a new service, by controlling stepwise according to the magnitude of the number of distribution h, which controls the billing system that changes an amount of money to bill the user 30.

Because the transaction system 1 can control the price of contents depending on its amount of transacting, it can provide the contents service in accordance with the intention of information offerer. A nameless information offerer can bill in such a manner that, for example, he distributes free the contents so that as many users 30 as possible may access and when he becomes recognized to some extent (if the number of distribution h reaches the predetermined number)), he begins to bill. It is possible that the user 30 pays the billed amount only for the contents that is sure to be valuable enough.

Moreover, by using such transaction system 1, it is possible to enhance not only an ambition to create the contents of famous information offerers who are widely recognized in society, but also an ambition to create the contents of nameless information offerers.

The transaction system 1 gives the user 30 the following merit. The desired contents of the user 30 rise and fall in the billed amount, as described above, depending on the number of distribution h within the predetermined time period. Because the user 30 can previously know the billed amount of desired contents, he can confirm that it is the billed amount corresponding to his desired contents before he acquires that contents.

According to the first embodiment of the present invention, when the pay contents are distributed, an amount of money to bill for distributing the contents once is determined depending on the number of times that the contents are distributed by distributing means within a predetermined time period. Therefore, by determining the billed amount for distributing the contents once depending on the number of times that the contents are distributed by distributing means of the transaction system 1, the billed amount reflects the intention of the side of distributing the contents the broadcast corporation 2 or the contents provider 4) and the estimation of the distributed side (user 30). Thus, the transaction system 1 can automatically control the system of billed amount for the contents depending on the amount of transaction of the contents or the amount of circulation thereof.

Consequently, it is possible to provide the information distributing method in which, when the pay contents are distributed, the billed amount for distributing the contents once automatically reflects the intention of contents' distributing side and the estimation of user.

A Second Embodiment

A transaction system 1a as a second embodiment has the same structure as that of the transaction system 1 as the first embodiment shown in FIG. 1 to FIG. 3 with respect to parts denoted by reference numerals, and so only a different point will be described.

The transaction system 1a differs from the transaction system 1 in a way of controlling the billed amount. Although the transaction system 1 adopts the stepwise control that the billed amount is controlled stepwise as the controlling method of billed amount, the transaction system 1a controls using a function ( hereinafter referred to as a function control) for controlling the billed amount.

The transaction system 1a utilizes a function to determine the billed amount relative to the number of distribution h, for example, as a formula (1).

$$\text{Billed amount [yen]} = M[0, \log h - 2.5] \times 100 \quad (1)$$

Here, M [a, b] expresses a larger value of numerical values a and b. In the transaction system 1a, for example, if the number of distribution h is one hundred times, the billed amount is set to be zero yen; if the number of distribution h is one thousand times, the billed amount is set to be fifty yen; if the number of distribution h is ten thousand times, the billed amount is set to be one hundred and fifty yen; and if the number of distribution h is one hundred thousand times, the billed amount is set to be two hundred and fifty yen.

According to the second embodiment of the present invention, it is possible to show the merit of the first embodiment as well as to make finer control of the billed amount because the way of controlling the billed amount is not the stepwise control but the function control.

A Third Embodiment

A transaction system 1b as a third embodiment has the same structure as that of the transaction system 1 as the first embodiment shown in FIG. 1 to FIG. 3 with respect to parts denoted by reference numerals, and so only a different point will be described.

The transaction system 1b differs from the transaction system 1 in the way of controlling the billed amount. Although the transaction system 1 adapts the stepwise control that the billed amount is controlled stepwise as the controlling method of billed amount, the transaction system 1b performs a function control different from that of the second embodiment to control the billed amount.

The transaction system 1b utilizes a function to determine the billed amount P relative to the number of distribution h, for example, as a formula (2).

$$\text{Billed amount } P[\text{yen}] = 800/\log h \quad (2)$$

In the transaction system 1b, for example, if the number of distribution h is ten thousand or less times, the billed amount P is fixed to be two hundred yen irrespective of the formula (2); if the number of distribution h exceeds ten thousand times, the billed amount P is determined according to the formula (2). If the number of distribution h is ten thousand or more times and less than one hundred thousand times, the billed amount P is set between two hundred yen and one hundred and sixty yen; if the number of distribution h is one hundred thousand or more times and less than one million times, the billed amount P is set between one hundred and sixty yen and one hundred and thirty-three yen. In addition, the function control of the transaction system 1b as the third embodiment may be used together with the function control of the transaction system 1a as the second embodiment.

According to the third embodiment of the present invention, it is possible not only to show the merit of the first embodiment, but also to communicate further widely the contents which were a hit enough (often accessed) to the world because the billed amount is made lower as the number of distribution h increases.

A Fourth Embodiment

A transaction system 1c as a fourth embodiment has the same structure as that of the transaction system 1 as the first embodiment shown in FIG. 1 to FIG. 3 with respect to parts denoted by reference numerals, and so only a different point will be described.

The transaction system 1c differs from the transaction system 1 in the way of controlling the billed amount. Although the transaction system 1 adopts the stepwise control that the billed amount is controlled stepwise as the controlling method of billed amount, the transaction system 1c performs, in addition to this method, a function control different from these of the second embodiment and the third embodiment to control the billed amount.

The transaction system 1c utilizes a function to determine the billed amount P relative to the number of distribution h, for example, as formulas (3.1) to (3.4).

$$0 \leq h < 1000 \, P = 0 \quad (3.1)$$

$$1000 \leq h < 10000 \, p = (h - 1000)/45 \quad (3.2)$$

$$10000 \leq h < 100000 \, P = 200 \quad (3.3)$$

$$100000 \leq h \, P = 150 \quad (3.4)$$

Figure 5:
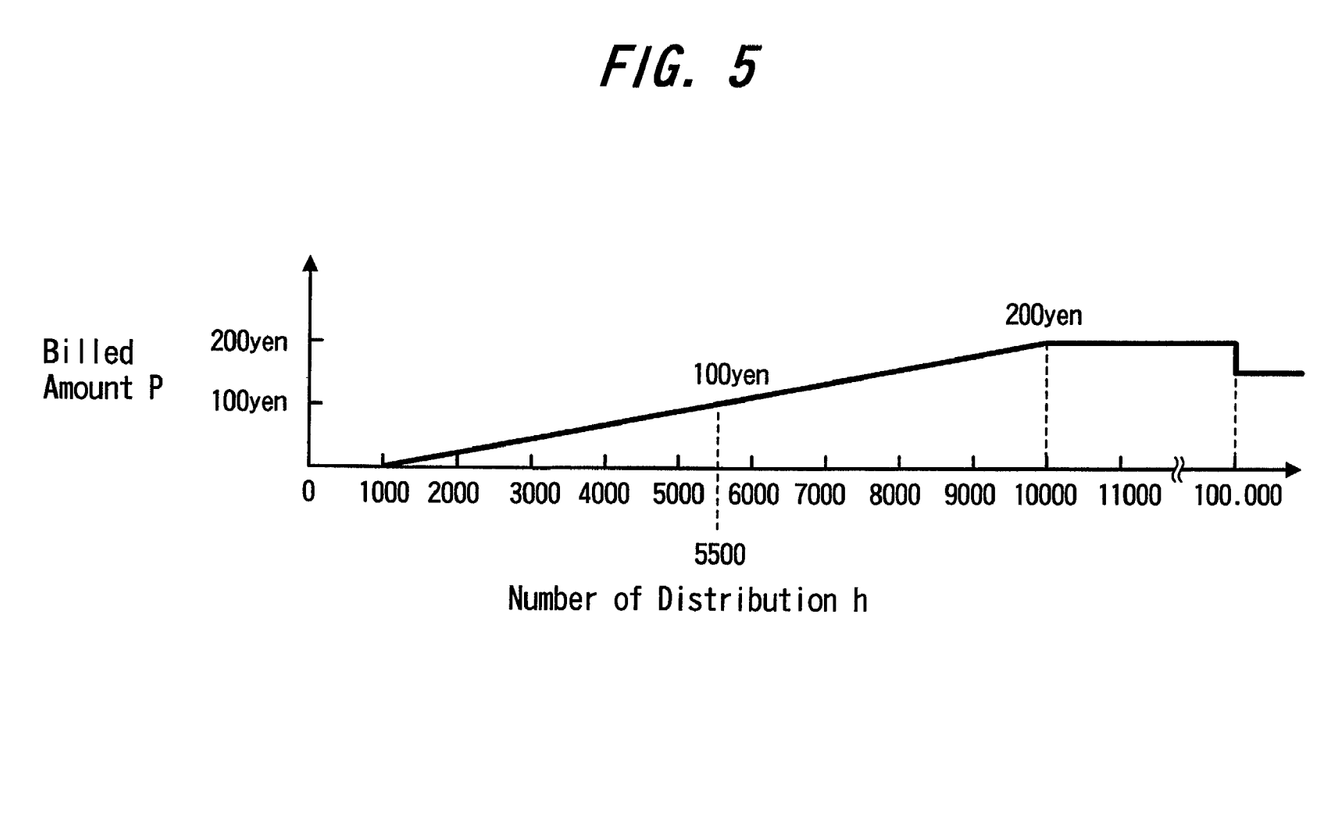
FIG. 5 is a diagram showing an example of the billed amount by the billing process in the information distributing method as the fourth embodiment according to the present invention.

In the transaction system 1c, as shown in FIG. 5, for example, if the number of distribution h is less than one thousand times, the billed amount P is zero (formula (3.1)); if the number of distribution h is one thousand or mare times and less than ten thousand times, the billed amount P is determined according to a function as formula (3.2); if the number of distribution h is ten thousand or more times and less than one hundred thousand times, the billed amount P is set to be two hundred yen (formula (3.3)); if the number of distribution h is one hundred thousand or more times, the billed amount P is set to be one hundred and fifty yen formula (3.4). In formula (3.2), a coefficient may be selected to be not only [1/45] but also, e.g. [1/30] or may be selected depending on past actual results.

According to the fourth embodiment of the present invention, it is possible not only to display the merit of the first embodiment, but also to make appropriate control of the billed amount based on the past actual results, a market survey, etc. because the stepwise control is combined with the function control.

A Fifth Embodiment

A transaction system 1d as a fifth embodiment has the same structure as that of the transaction system 1 as the first embodiment shown in FIG. 1 to FIG. 3 with respect to parts denoted by reference numerals, and so only a different point will be described.

The transaction system 1d differs from the transaction system 1 in the way of controlling the billed amount. Although the transaction system 1 adopts the stepwise control that the billed amount is controlled stepwise as the controlling method of billed amount, the transaction system id performs, in addition to this method, a function control different from the second embodiment to the fourth embodiment to control the billed amount.

The transaction system 1d utilizes a function to determine the billed amount P relative to the number of distribution h, for example, as formula (4.1) to formula (4.3).

$$0 \leq h < 2000 \; P = 0 \quad (4.1)$$

$$2000 \leq h < 12000 \; P = \sqrt{h - 2000} \quad (4.2)$$

$$12000 \leq h \; P = 200 \quad (4.3)$$

Figure 6:
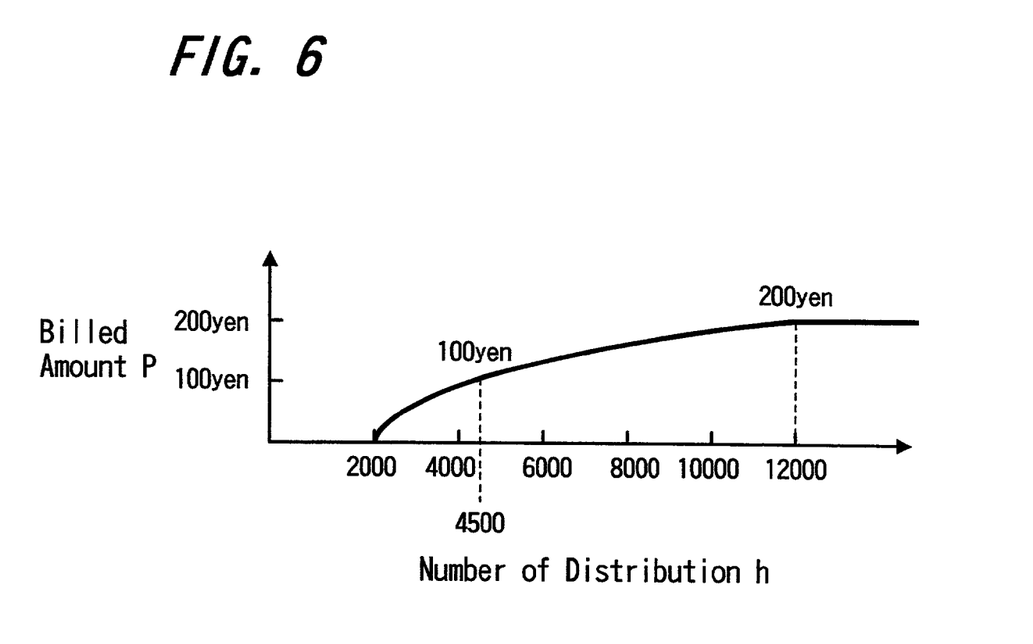
FIG. 6 is a diagram showing an example of the billed amount by the billing process in the information distributing method as the fifth embodiment according to the present invention.

In the transaction system id, as shown in FIG. 6, for example, if the number of distribution h is less than two thousand times, the billed amount P is zero (formula (4.1); if the number of distribution h is two thousand or more times and less than twelve thousand times, the billed amount P is determined according to the function as formula (4.2); if the number of distribution h is twelve thousand or more times, the billed amount P is fixed to be two hundred yen (formula (4.3)). In formula (4.2), a coefficient of the function where the number of distribution h is two thousand or more times and less than twelve thousand times may be selected to be not only [2] but also, e.g. [3] or may be selected depending on past actual results.

Figure 7A:
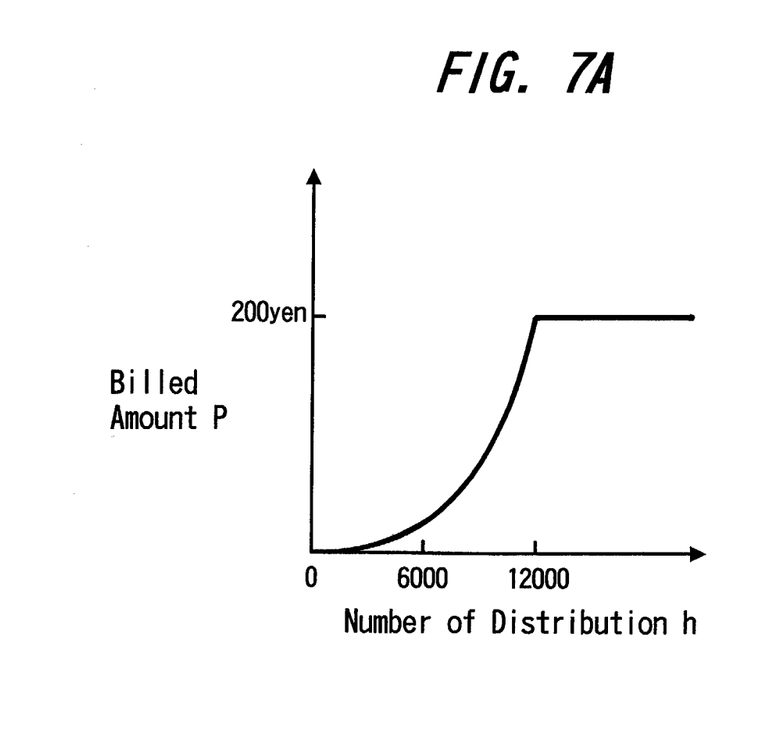
FIG. 7 is a diagram showing the billed amount according to the modified examples of the billing process in FIG. 6.
Figure 7B:
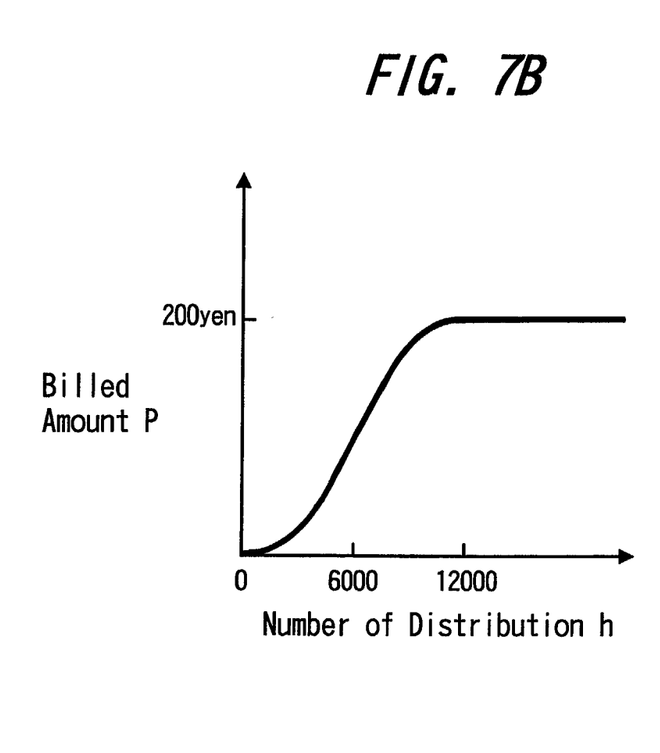

Also, the transaction system 1d may be arranged so that, until the billed amount becomes fixed as in the case where the number of distribution h is twelve thousand or more times, it may be controlled to become the square of the number of distribution h from a certain time point as shown in (A) of FIG. 7, or it may be controlled in a manner that the billed amount rises smoothly from a point where the number of distribution h equals zero as shown in (B) of FIG. 7. That is, the transaction system 1d may be arranged so that the control such as (A) of FIG. 7 or (B) of FIG. 7 can be selected.

According to the fifth embodiment of the present invention, it is possible not only to show the merit of the first embodiment, but also to make appropriate control of the billed amount based on past actual results, a market survey, etc. in the same way as the fourth embodiment.

A Sixth Embodiment

A transaction system 1e as a sixth embodiment has the same structure as that of the transaction system 1 as the first embodiment shown in FIG. 1 to FIG. 3 with respect to parts denoted by reference numerals, and so only a different point will be described.

The transaction system 1e differs from the transaction system 1 in the way of controlling the billed amount. Although the transaction system 1 adopts the stepwise control that the billed amount is controlled stepwise as the controlling method of billed amount, the transaction system 1e performs, in addition to this method, a function control different from the second embodiment to the fifth embodiment to control the billed amount.

The transaction system 1e utilizes a function to determine the billed amount relative to the number of distribution h, for example, as formula (5.1) to formula (5.5). In this case, it is assumed that a term concerning the number of distribution h is shorter than that, e.g. used in the first embodiment to the fifth embodiment (e.g. a day).

$$0 \leq h < 10 \; P = h^2 \quad (5.1)$$

$$10 \leq h < 50 \; P = 100 + 2*(h - 10) \quad (5.2)$$

$$50 \leq h < 150 \; P = 180 + (h - 50) \quad (5.3)$$

$$150 \leq h < 1150 \; P = 280 + 0.1*(h - 150) \quad (5.4)$$

$$1150 \leq h \; P = 380 \quad (5.5)$$

Figure 8:
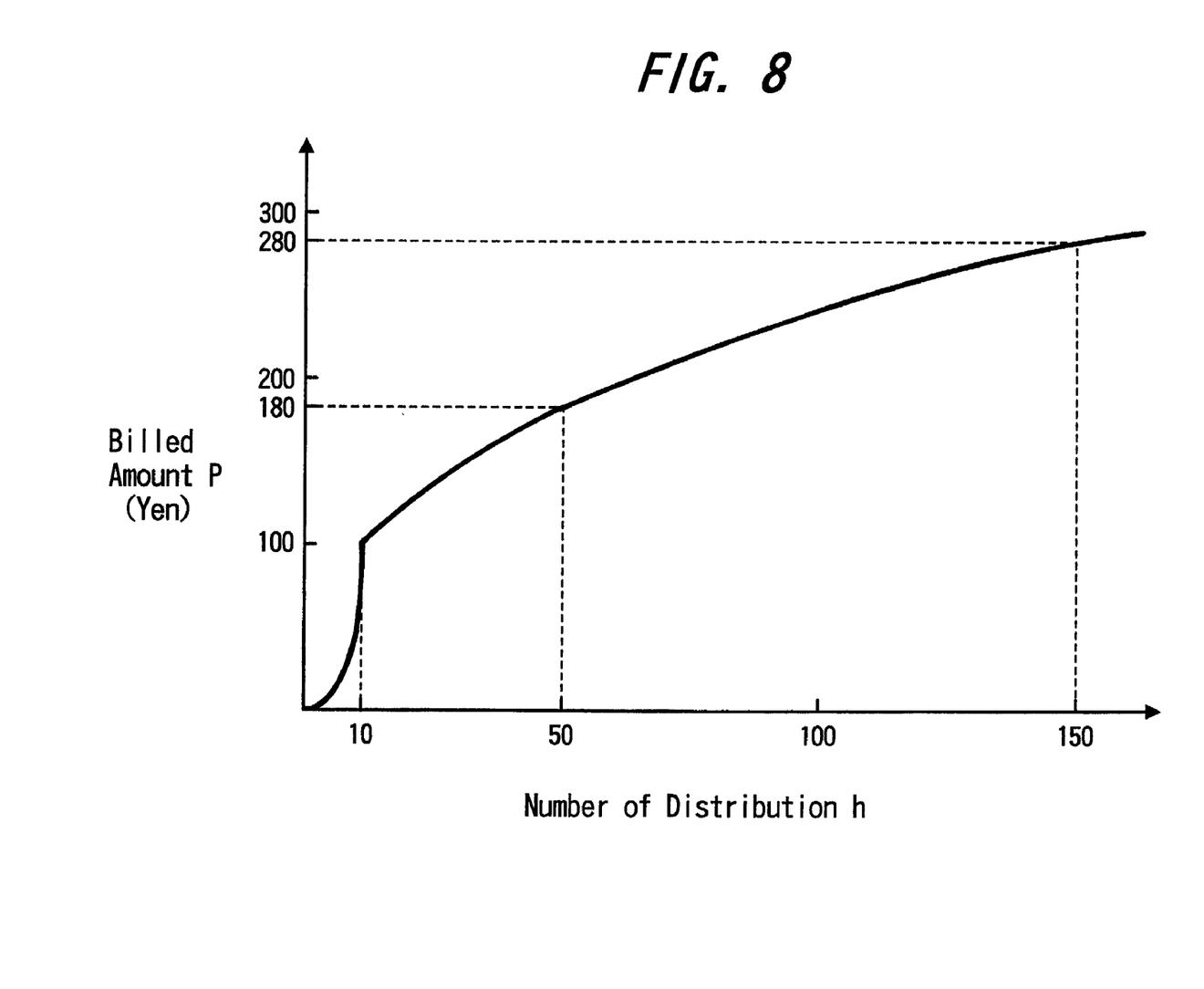
FIG. 8 is a diagram showing an example of the billed amount by the billing process in the information distributing method as the sixth embodiment according to the present invention.

In the transaction system 1e, as shown in FIG. 8, for example, if the number of distribution h is less than ten times, the billed amount is a square of the number of distribution h (formula (5.1)); if the number of distribution h is ten or more times and less than fifty times, the billed amount is determined as shown in formula (5.2); if the number of distribution h is fifty or more times and less than one hundred and fifty times, the billed amount is determined as shown in formula (5.3); if the number of distribution h is one hundred and fifty or more times and less than one thousand, one hundred and fifty times, the billed amount is determined as shown in formula (5.4); if the number of distribution h is one thousand, one hundred and fifty or more times, the billed amount is fixed to be three hundred and eighty yen (formula (5.5)).

According to the sixth embodiment of the present invention, it is possible not only to display the merit of the first embodiment, but also to make appropriate control of the billed amount based on past actual results, a market survey, etc. in the same way as the fourth embodiment and the fifth embodiment.

Incidentally, the present invention is not limited to the above described embodiments.

In the description of the aforesaid embodiments, the transaction system 1 can reduce the billed amount by regrading an investment in the contents as recovered when the number of distribution h reaches a predetermined number of times. This enables the contents to be provided for still more users 30. Moreover, if the transaction system 1 uses the number of distribution h per time and raises the billed amount as the number of distribution h increases, the access for distribution can be shifted to a time zone when the contents are easy to be acquired. Therefore, the transaction system 1 can relax line's congestion to an average level.

Furthermore, in the foregoing description, although the number of distribution h is divided by the predetermined reference number of times to determine the billed amount P, these are able to be set optionally.

In addition, the way of controlling to determine the billed amount of the transaction system 1 may be arranged so that the plurality of ways of controlling the billed amount in each of the aforesaid embodiments are combined. For example, the first embodiment can be combined with the sixth embodiment. In this case, it will be sufficient to use the cumulative number of distribution h1 on one hand and the daily number of distribution h2 on the other hand and determine the billed amount by adding them and dividing into halves.

The transaction system 1 may, for example, be constructed by the software and recorded in the information recording medium 15 shown in FIG. 2. Also, the transaction system 1 may be included in the information distributor.

As described above, according to the present invention, it is possible to provide the information distributing method in which, when information subjected to billing is distributed, the amount of money billed when information is distributed once reflects automatically the intention of information offerer and the estimation of user.

Having described preferred embodiments of the present invention with reference to the accompanying drawings, it is to be understood that the present invention is not limited to the above mentioned embodiments and that various changes and modifications can be effected therein by one skilled in the art without departing from the spirit or scope of the present invention as defined in the appended claims.

What is claimed is:

1. An information distributing method for distributing information subjected to billing in an information distributing system, by using wireless communication or wired communication, the method comprising the step of: electronically process an amount of money billed to a user each subsequent time said information is distributed to said user is determined depending on the number of times that said information has previously been distributed to at least one user within a predetermined time period, each said amount of money billed being determined independently for each time said information is distributed.

2. The information distributing method according to claim 1, wherein said time period is one from a predetermined time point to a current time point.

3. The information distributing method according to claim 1, wherein said time period is a definite term from a predetermined time point.

4. The information distributing method according to claim 1, wherein said time period is one from an optionally set time point to a current time point.

5. The information distributing method according to claim 1, wherein said time period is one from a first optionally set time point to a second optionally set time point.

6. The information distributing method according to claim 1, wherein said time period is a definite term from an optionally set time point.

7. The information distributing method according to claim 1, wherein said time period is a definite term down to the current time point.

8. The information distributing method according to claim 1, wherein said time period is one until an optionally set time point.

9. The information distributing method according to claim 1, wherein when said number of times of distribution reaches a previously set number of times or more, said amount of money billed for said information is raised.

10. The information distributing method according to claim 1, wherein when said number of times of distribution reaches a previously set number of times or more, said amount of money billed for said information is reduced.

11. The information distributing method according to claim 1, wherein said amount of money billed for said information is determined depending on a value obtained by substituting said number of times of distribution for a previously set function.

12. The information distributing method according to claim 1, wherein said information is audio information, video information, game information or book information, or any combination of them.

13. An information distributing method for distributing information subjected to billing in an information distributing system, by using wireless communication or wired communication, the method comprising the step of: electrically process an amount of money billed to a user each subsequent time said information is distributed to said user is determined in a composite manner depending on respective numbers of times that said information has previously been distributed to at least one user in a plurality of set terms, each said amount of money billed being determined independently for each time said information is distributed.

14. An information distributing method for distributing information subjected to billing in an information distributing system, using wireless communication or wired communication, the method comprising the step of: a receiver to electronically select selects at least one term of a plurality of set terms and an amount of money billed to a user each subsequent time said information is distributed to said user is determined depending on the number of times that said information has previously been distributed to at least one user in said selected term, each said amount of money billed being determined independently for each time said information is distributed.

15. An information distributing method for distributing information subjected to billing in an information distributing system, comprising the steps of: electronically
distributing said information to a user;
counting the number of times said information is previously distributed to at least one user; and
controlling a billing system for billing an amount of money for a next subsequent distribution depending on the number of previous distributions counted, each said amount of money billed being determined independently for each time said information is distributed.

16. The information distributing system according to claim 15, wherein the counted distribution number is compared with a reference value.

17. A transaction method to control a billing system for information to be distributed, by using wireless communication or wired communication, comprising the steps of: electronically
counting a number of previous distributions of said information to at least one user; and
controlling a billing information for billing an amount of money for a next subsequent distribution depending on a counted number of previous distributions, each said amount of money billed being determined independently for each time said information is distributed.

18. The transaction method according to claim 17, wherein said step for controlling a billing information includes a step for comparing said counted number of distribution with a reference value.

19. A transaction system to control a billing system for information to be distributed, comprising:
a means for counting a number of previous distributions of said information to at least one user; and
a means for controlling a billing information for billing an amount of money for a next subsequent distribution depending on a counted number of previous distributions, each said amount of money billed being determined independently for each time said information is distributed.

20. The transaction system according to claim 19, wherein said means for controlling a billing information includes a means for comparing said counted number of distribution with a reference value.

21. A transaction method to control a billing system for information to be distributed, comprising the steps of:
counting the number of times that a content is previously distributed to at least one user during a predetermined time period, the at least one user being billed at the time of distribution for an amount of money of said content;
charging said amount of money to be billed to the at least one user for a next subsequent distribution of said content based on the result of counting of said previous distributions; and
billing a plurality of users for said charged amount of money of said content when said content is subsequently distributed to the at least one user after said charging of the amount of money, each said amount of money billed being determined independently for each time said information is distributed.

22. The information distributing method according to claim 1, wherein said amount of money billed for subsequent distributions of said information is automatically altered each time said distribution reaches predetermined distribution thresholds associated with said number of times said information has previously been distributed.

23. The information distributing method according to claim 15, wherein said amount of money billed for subsequent distributions of said information is automatically altered each time said distribution reaches predetermined distribution thresholds associated with said number of times said information has previously been distributed.

24. The transaction system according to claim 19, wherein said amount of money billed for subsequent distributions of said information is automatically altered each time said distribution reaches predetermined distribution thresholds associated with said number of times said information has previously been distributed.

25. The transaction method according to claim 21, wherein said amount of money billed for subsequent distributions of said information is automatically altered each time said distribution reaches predetermined distribution thresholds associated with said number of times said information has previously been distributed.

* * * * *